United States Patent [19]
Griffiths

[11] Patent Number: 5,273,308
[45] Date of Patent: Dec. 28, 1993

[54] HEIGHT CONTROL OF AIR SUSPENDED VEHICLES

[75] Inventor: Paul J. Griffiths, Clwyd, Wales

[73] Assignee: Rubery Owen-Rockwell Limited, Wednesbury, United Kingdom

[21] Appl. No.: 855,039

[22] PCT Filed: Nov. 6, 1990

[86] PCT No.: PCT/GB90/01698

§ 371 Date: May 7, 1992

§ 102(e) Date: May 7, 1992

[87] PCT Pub. No.: WO91/06440

PCT Pub. Date: May 16, 1991

[30] Foreign Application Priority Data

Nov. 7, 1989 [GB] United Kingdom ............... 8925140
Aug. 3, 1990 [GB] United Kingdom ............... 9017090

[51] Int. Cl.⁵ ..................... B60G 17/00; B60G 11/26
[52] U.S. Cl. ................................. 280/711; 280/714; 280/840
[58] Field of Search .................. 280/714, 840, 6.12, 280/711, 43.23; 180/271

[56] References Cited

U.S. PATENT DOCUMENTS

| | | | |
|---|---|---|---|
| 4,335,901 | 6/1982 | Gladish | 280/714 X |
| 4,558,886 | 12/1985 | Straub | 280/840 X |
| 4,733,876 | 3/1988 | Heider et al. | 280/6.12 |
| 4,865,349 | 9/1989 | Church, Jr. | 280/711 |
| 4,923,210 | 5/1990 | Heider et al. | 280/840 X |

FOREIGN PATENT DOCUMENTS

| | | | |
|---|---|---|---|
| 0478924 | 3/1992 | European Pat. Off. | 280/714 |
| 3523093 | 1/1987 | Fed. Rep. of Germany | 280/714 |
| 3638849 | 5/1988 | Fed. Rep. of Germany | 280/714 |
| 2192157 | 1/1988 | United Kingdom . | |
| 2214142 | 8/1989 | United Kingdom . | |
| 9107291 | 5/1991 | World Int. Prop. O. | 280/714 |

Primary Examiner—Margaret A. Focarino
Assistant Examiner—Peter English
Attorney, Agent, or Firm—Spensley Horn Jubas & Lubitz

[57] ABSTRACT

In an air suspension system of a vehicle the height of the vehicle platform is maintained in use by height control valves. To facilitate loading, the height may be adjusted by an operator by overriding the height control valves by means of a selector valve. The height may then be adjusted by a Raise/Lower valve. If the operator omits to return the selector valve and/or the Raise/Lower valve to their normal condition, the selector valve is reverted to its normal condition by a pilot line connected to a service brake line so that the vehicle automatically returns to its normal ride height on the first brake application. Alternatively the valve may be operated by a solenoid connected to the brake light circuit so that the service brake line is not affected. In an alternative arrangement, the suspension system height is adjusted by two manually-operable spring-return valves. Again, a selector valve reverts to a condition in which ride height is attained on application of the service brake.

23 Claims, 7 Drawing Sheets

HEIGHT CONTROL OF AIR SUSPENDED VEHICLES

This invention relates to air suspension systems for load carrying vehicles and to load carrying vehicles incorporating air suspension systems.

In such systems and vehicles there is provided at least one height control valve operatively connected, or adapted to be connected, between the vehicle and one axle, and pneumatically connected to a source of pressure air and to air springs As the axle to vehicle distance is varied, depending on the loading of the vehicle, the height control valve operates to admit pressure air to, or exhaust air from, the air springs to restore the vehicle-to-axle distance to its design value. In multi-axle installations provision is made for equalising the loads on the axles by interconnecting the air springs at each side of the vehicle. When such a vehicle enters a loading bay or dock (hereinafter referred to as a dock) to be loaded or unloaded it is frequently the case that the vehicle platform height is different from that of the dock. Accordingly, the air suspension system has provision (conventionally known as a Raise/Lower valve) for overriding, or by-passing, the height control valve so that the vehicle platform height can be adjusted, by raising or lowering, to equate with the height of the dock. Generally, where the vehicle is a trailer, the tractor will remain coupled to the trailer whilst the loading-/unloading operation is carried out so that the dock can be vacated without delay to accept the next vehicle. However, this is not necessarily so and the tractor may be uncoupled from the trailer when the latter has been docked Such an air suspension system as described is hereinafter referred to as "an air suspension system of the type described".

If the vehicle platform height has been raised or lowered on docking, the operator should operate the system to restore the vehicle platform height to its normal ride height before moving the vehicle from the dock. If, however, he fails to do so, damage can be caused to the suspension system and/or to its shock absorbers.

The purpose of this invention is to make provision in an air suspension system of the type described for ensuring that the air suspension is restored to its normal ride height condition when a vehicle to which the system is fitted is moved following a raise or lower operation of the vehicle platform.

According to a first aspect the present invention consists in an air suspension system for a load carrying vehicle, the system comprising air springs, a height control valve means connected to the air springs and adapted to be pneumatically connected to a pressure air supply, and a first valve. means whereby the height control valve means can be over-ridden, or by-passed, in use to vary the height of a load-carrying platform of the vehicle relative to an axle of the vehicle from a normal ride height, wherein the first valve means is connected via second valve means to the air springs, the second valve means having first and second operating conditions and being connected to the height control valve means whereby in said first condition the air springs are enabled to be inflated/deflated via the height control valve means and in said second condition the air springs are connected to the first valve means whereby the air springs may be inflated/deflated, and wherein remote operating means is provided to cause the second valve means to be operated to the second condition, the remote operating means comprising a selector valve having first and second operating conditions being adapted to be connected to a pressure air supply and being in pressurized fluid communication with the second valve means for remote operation thereof when the selector valve is operated to its first operating condition and wherein means is provided to operate the selector valve to its second operating condition whereby the second valve means operates in its first operating condition and inflation/deflation of the air springs is controlled by the height control valve means.

The selector valve may be a pilot operated valve, the pilot being pneumatically or electrically operated to operate the selector valve to its second condition. If a pneumatic pilot, it may be connected to a service brake line of a vehicle to which the system is fitted whereby the pilot is actuated when the service brake is applied. If the pilot is electrically operated the electrical power or signal may be derived from a brake light circuit of the vehicle to which the system is fitted for use whereby the pilot is actuated, directly —or indirectly via an electrically operated pneumatic valve—when the service brake is applied.

The system may be arranged to permit independent inflation/deflation of the air springs on each side of a vehicle to which the system is fitted for use, so permitting lateral levelling of the vehicle platform if the vehicle is resting on unlevel ground.

According to a second aspect of the present invention a vehicle is provided which includes an air suspension system in accordance with the first aspect of the invention herein set forth.

According to a third aspect of the present invention a kit of parts is provided adapted for use in an air suspension system for a load carrying vehicle and comprising a height control means which connects to air springs and to a pressure air supply, and a first valve means whereby the height control means can be over-ridden, or by-passed, in use to vary the height of a load-carrying platform of the vehicle relative to an axle of the vehicle from a normal ride height, remotely operable second valve means, as described above in connection with the first aspect of the invention a two condition selector valve adapted to be operable by power means to at least one of the said conditions, and conduit means to connect the selector valve to the remote operator of the second valve means. The power means selector valve is operable may be a pneumatic pilot actuator. A low power solenoid operated two position pneumatic valve may be included in the kit of parts and means to connect the valve to the pilot actuator. There may also be first valve means in accordance with the first valve means of the air suspension system as set forth in the said first aspect of the invention. At least some of the parts may be contained and connected in a box ready for fitting to a vehicle for use.

Embodiments of the invention will now be described by way of example only with reference to the accompanying drawings in which.

Figure 1:
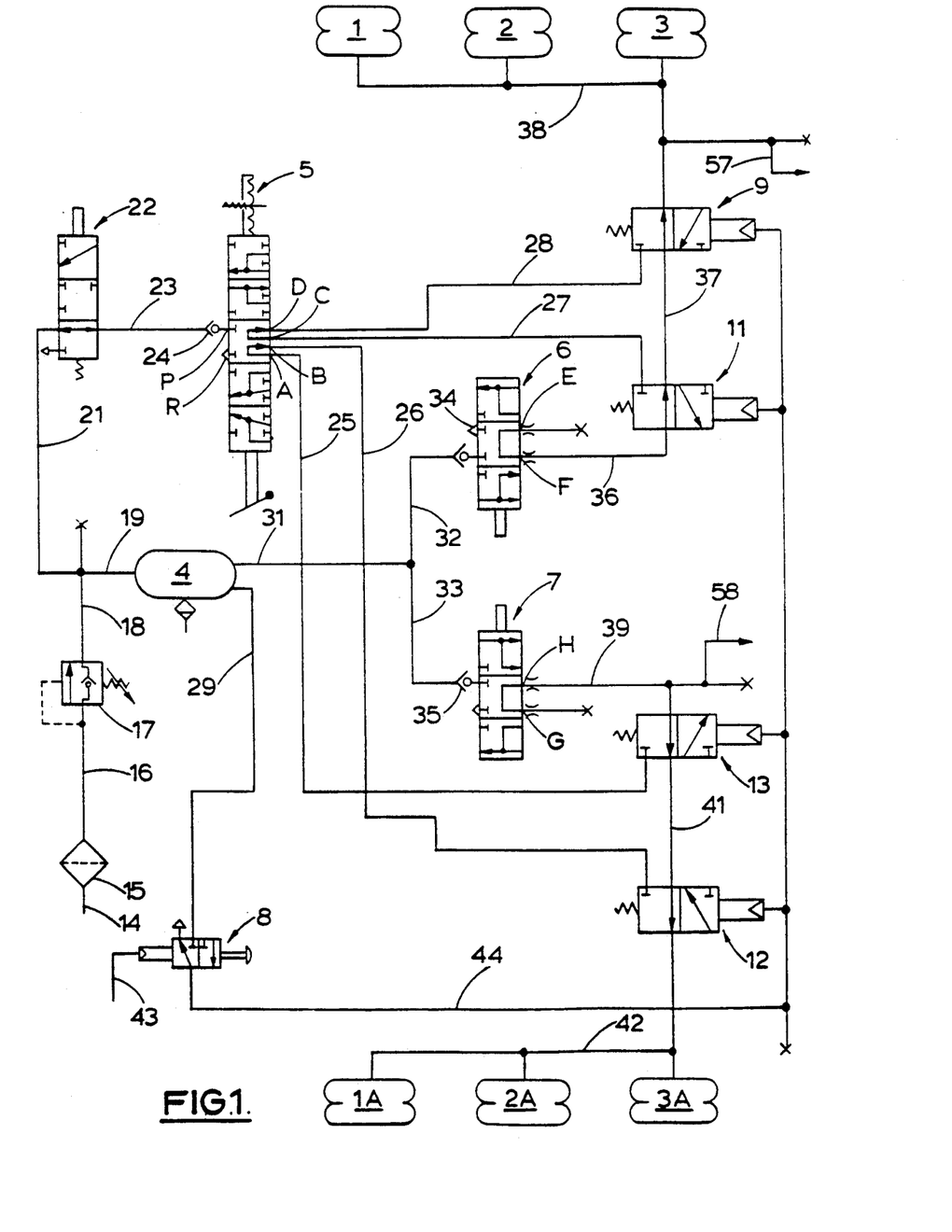
FIG. 1 is a circuit diagram of an air suspension system in accordance with the present invention for a tri-axle installation incorporating one design of second valve means.

Referring to FIG. 1 of the accompanying drawings, a trailer (not shown) has three axles, each suspended by two air springs 1, 1A; 2, 2A, and 3, 3A. The trailer has the usual pressure air reservoir 4 and a Raise/Lower valve 5 (the first valve means) having ports, A, B, C, D, P and R. There are also two height control valves 6, 7, a manually operated selector valve 8 and second valve means, shown as comprising two 3-way pilot operated, spring return valves 9, 11 and 12, 13, for the air springs on each side of the trailer.

A pressure air supply is provided, for example from a tractor to which the trailer is connected, via a brake reservoir (not shown), a pipe 14, a filter 15 and a pipe 16 to a pressure protection valve 17 and from there via pipes 18, 19 and 21 to the reservoir 4 and a height limiting valve 22. The height limiting valve 22 (connected between the trailer chassis and an axle) has been included as this is required on some, but not all, trailer platform raising installations to limit the height to which the platform can be raised by cutting supply of pressure air to the Raise/Lower valve. A pipe 23 connects valve 22 to the Raise/Lower valve 5 at port P via an optional check valve 24. Port R of valve 5 exhausts to atmosphere and ports A, B, C, D are connected respectively to valves 13, 12, 11 and 9 by pipes 25 to 28 respectively.

The reservoir 4 is connected by a pipe 29 to the selector valve 8 and to the height control valves 6, 7 via pipes 31, 32, 33 and respective check valves 34, 35. Valve 6 is connected to valve 11 via pipe 36, valve 11 is connected to valve 9 by pipe 37 and valve 9 is connected to air springs 1, 2 and 3 by pipes 38. Similarly valve 7 is connected to valve 13 via pipe 39, valve 13 is connected to valve 12 by pipe 41, and valve 12 is connected to air springs 1A, 2A, 3A by pipes 42.

Selector valve 8 is reset by a pilot which is connected by pipe 43 to a pressure air supply. This supply may, for example, be from the supply to the trailer service brake whereby an application of the trailer service brake causes the selector valve 8 to revert to, or remain in, the condition shown in FIG. 1. Valve 8 is connected by pipes 44 to the pilots of the valves 9, 11, 12, 13.

Figures 2, 3, 4:
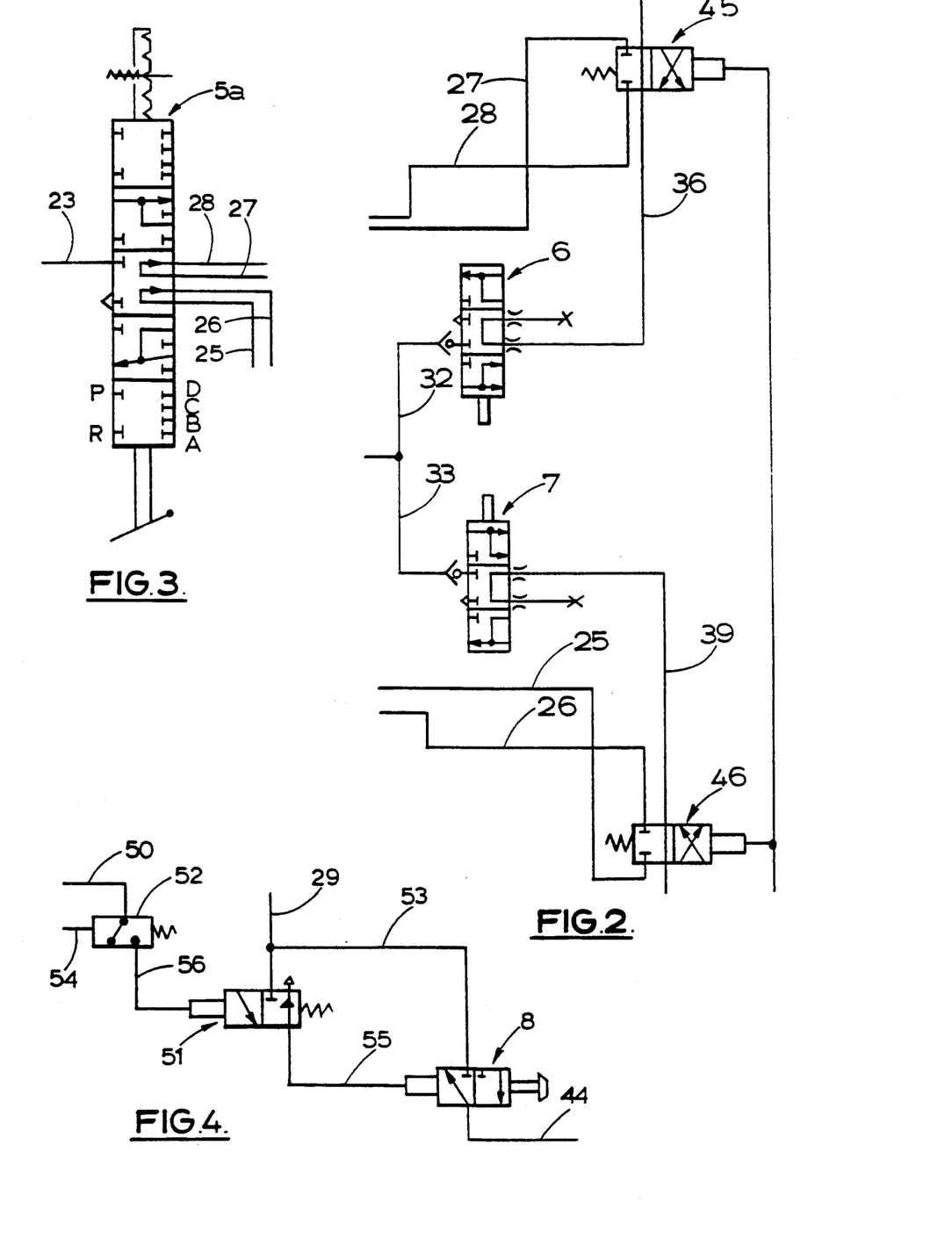
FIG. 2 shows schematically a second design of second valve means for use in the circuit of FIG. 1.
FIG. 3 illustrates schematically an alternative type of first valve means which may be substituted for first valve means of FIG. 1.
FIG. 4 shows schematically an alternative method of operating a selector valve of the circuit of FIG. 1.

Referring to FIG. 2, the 3-way valves 9, 11 and 12, 13 are replaced by one 4-way valve 45, 46 in each case. These valves are also pilot operated and spring return.

FIG. 3 shows schematically an alternative construction of Raise/Lower valve, 5a. This differs from the Raise/Lower valve 5 of FIG. 1 in that in the Raise Stop and Lower Stop conditions (respectively the upper and lower "boxes") the ports A, B, C and D are all blocked whereas in valve 5 the ports A and C are connected to atmosphere via port R in the Raise Stop condition, and in the Lower Stop condition the ports A and C are connected to pressure air via port P.

The operation of the installed system will now be described. Referring again to FIG. 1, it is assumed the various valves are in the conditions shown with the trailer platform at its normal ride height, a tractor is connected to the trailer and the combination is parked on the tractor brake, that is, pipe 43 is not pressurised, and the reservoir 4 is charged with pressure air. If the tractor engine is running its compressor will be supplying pressure air to the trailer air suspension system via pipe 14 and filter 15.

If it is desired to raise the trailer platform to be level with a dock, the selector valve 8 is operated manually to admit pressure air from reservoir 4 through that valve 8 and pipes 44 to the pilots of valves 9, 11, 12 and 13 whereby these valves change over. Raise/Lower valve 5 is then operated manually to the Raise Condition (second "box" from the top). Pressure air now passes from reservoir 4 and/or the tractor compressor through height limiting valve 22 and ports P, D and B of the Raise/Lower valve 5 from whence it passes through valves 9 and 12 to the air springs 1, 2, 3 and 1A, 2A, 3A, extending them.

When the trailer platform rises to the desired height the Raise/Lower valve 5 is selected to the Raise Stop condition (top "box"). Ports B and D are now blocked, sealing the pressure air in the air springs, and ports A and C, which had been blocked, are now connected to port R and atmosphere. It will have been seen that the operation of valves 11 and 13 consequent on operation of the selector valve 8, has disconnected the height control valves 6, 7 from their respective air springs, so that the normal height control mechanism has been by-passed.

In the normal course of events the operator should either select the "Ride" condition (middle "box") with the Raise/Lower valve 5 or reset the selector valve 8 manually before driving the trailer away from the dock. If he does the former, the ports A and B will be connected and also the ports C and D, and if he does the latter valves 9, 11, 12 and 13 will all revert. The height control valves 6, 7 will be in their "Lower" conditions (top and bottom "boxes" respectively). In either case the air springs will exhaust to atmosphere via the reverted valves 9, 11 and 12, 13 and valves 6, 7 until valves 6, 7 revert to the mid-selection as the trailer platform lowers to the normal ride height.

If the operator selects "Ride" with the Raise/Lower valve 5 but fails to reset the selector valve 8 then valves 9, 11, 12, 13 remain in the operated condition. The air springs will still exhaust via valve 9, valve 5, valve 11 and valve 6 and via valve 12, valve 5, valve 13 and valve 7 until the normal ride height is attained.

If the operator fails to select "Ride"0 with the Raise/Lower valve 5 and also fails to reset the selector valve 8 before driving off then his first application of the trailer service brake will cause the selector valve 8 to revert. This exhausts the pilots of valves 9, 11, 12, 13 and these revert causing the air springs to be connected to the respective height control valves 6, 7 via valves 9, 11 and valves 12, 13 respectively. Again, the air springs are exhausted until the normal ride height is attained. A similar result is achieved if the Raise/Lower valve 5 is left selected in the "Raise Stop" condition and the selector valve 8 is reset manually before driving off, also if valve 5 has been left selected in the "Raise" condition. Thus the trailer platform is restored to its normal ride height from a raised position either before, or immediately as the trailer is driven away, irrespective of whether the operator wholly selects, partially selects, or fails to select the normal ride height condition and so avoiding damage to suspension and/or shock absorbers and/or air springs due to the trailer's being driven with its platform in a raised condition.

Similarly, if it is required to lower the trailer platform on docking, the system which has been described also ensures that the platform is raised back to normal ride height before, or immediately as, the trailer is driven away. Thus, the selector valve 8 is operated and the Raise/Lower valve 5 is moved to the "Lower" condition (fourth "box" from top). As before, this results in isolation of the height control valves 6, 7 from the air springs and the latter are connected to atmosphere via valves 9, 12 and ports B, D and R of valve 5. When a "Lower Stop" selection is made the ports B and D are blocked preventing further escape of air from the air springs.

When the Raise/Lower valve 5 is returned to the "Ride" condition the height control valves 6, 7 (now conditioned to inflate the air springs) are reconnected to the air springs which inflate via valves 6, 11, 5, 9 and valves 7, 13, 5, 12 because the selector valve 8 has not been reset. Inflation ceases due to pressure air cut off by valves 6, 7 when normal ride height is attained.

Alternatively, if the selector valve 8 is reset manually, or through application of the trailer service brake, whilst Raise/Lower valve 5 remains in the "Lower Stop" condition the valves 9, 11, 12, 13 revert and the air springs are re-inflated to normal ride height via valves 6, 11, 9 and valves 7, 13, 12. This is also the inflation route if valve 5 is returned to the "Ride" condition, or if valve 5 has been left in the "Lower" condition instead of "Lower Stop".

With regard to FIG. 2, although the 3-way valves 9, 11 and 12, 13 of FIG. 1 have been replaced by the 4-way valves 45, 46 respectively, the system operates in the same way as has been described with reference to FIG. 1.

Turning now to FIG. 3, an alternative Raise/Lower valve 5a is provided which may be used in the system of FIG. 1. This valve has the same porting and connections as the Raise/Lower valve 5 of FIG. 1 and for the "Ride", "Raise" and "Lower" conditions and consequently for these selections the system functions as has been described for FIG. 1. When the valve 5a is selected to the "Raise Stop" condition (top "box") all ports A, B, C, D, P and R are blocked, and similarly in the "Lower Stop" selected condition.

Considering the "Raise Stop" condition (following a "Raise" selection), if the selector valve 8 is now reset, manually or as a consequence of operation of the trailer service brake, the valves 9, 11, 12, 13 revert. Since the height control valves 6, 7 are in the "Lower" condition the air springs are connected to atmosphere via valves 9, 11, 6 and 12, 13 7 respectively until normal ride height is attained when valves 6, 7 return to the midselection condition, cutting off any further outflow.

Similarly, when the Raise/Lower valve 5a is in the "Lower Stop" condition following a "Lower" selection and the selector valve 8 is reset the valves 9, 11, 12, 13 revert. Valves 6, 7 are now in the "Raise" condition because the trailer platform is below the normal ride height and so the air springs are re-inflated via valves 6, 11, 9 and 7, 13, 12 to the normal ride height. If the valve 5a is fitted in the circuit of FIG. 2 instead of valve 5 the operation is similar except that inflation/deflation of the air springs occurs through valves 45, 46 instead of valves 9, 11 and 12, 13.

Because the ports A, B, C, D, P and R are all blocked in the "Raise Stop" and "Lower Stop" selected conditions it is not necessary to include valves 11, 13 in the circuit. If these valves are omitted pipe 27 is connected to pipe 37 and pipe 25 is connected to pipe 41.

In the provision of a kit of components for retro-fitting to a trailer fitted with a conventional "Raise/Lower" system it may be desirable to supply the four valves (as 9, 11, 12, 13) so that the kit is suitable irrespective of whether a Raise/Lower valve as valve 5 or as valve 5a is fitted to the trailer.

Referring now to FIG. 4, the selector valve 8 is again shown as having manual operation to cause a "Raise" or "Lower" selection of the Raise/Lower valve 5 (or valve 5a) to become effective. It may be desired to avoid taking a tapping from a trailer brake line, for example the service brake line, to cause resetting of the valve 8. Accordingly, in FIG. 4 we provide a 3-way 2-position spring return, solenoid-operated pilot valve 51 and a relay switch 52 having an electrical power supply 50 thereto. Switch 52 is connected to the solenoid of the pilot valve 51 by a cable 56. The relay switch 52 is electrically connected by cable 54 to the trailer brake light circuit so that when the latter is energised a small proportion of the electrical power is used to operate the relay switch 52 and so cause energisation of the solenoid to operate pilot valve 51.

Pilot valve 51 is connected pneumatically to the reservoir 4 via pipe 29 and to the pilot of the selector valve 8 via a pipe 55. Valve 8 is connected to the reservoir 4 via pipes 29, 53.

When the trailer brake is applied the brake light circuit is energised, operating the pilot valve 51 as has been explained. This causes the reservoir 4 to be connected to the pilot of the selector valve 8 via pipe 29, pilot valve 51 and pipe 55 causing the selector valve 8 to reset. As shown, resetting of the selector valve 8 is effected by means of the electrical relay switch 52 so as to minimise the power drain from the brake light circuit. However, a preferred alternative is a direct operating, low power, solenoid valve 51 connected directly into the brake light circuit, so eliminating the relay switch 52.

Figure 5:
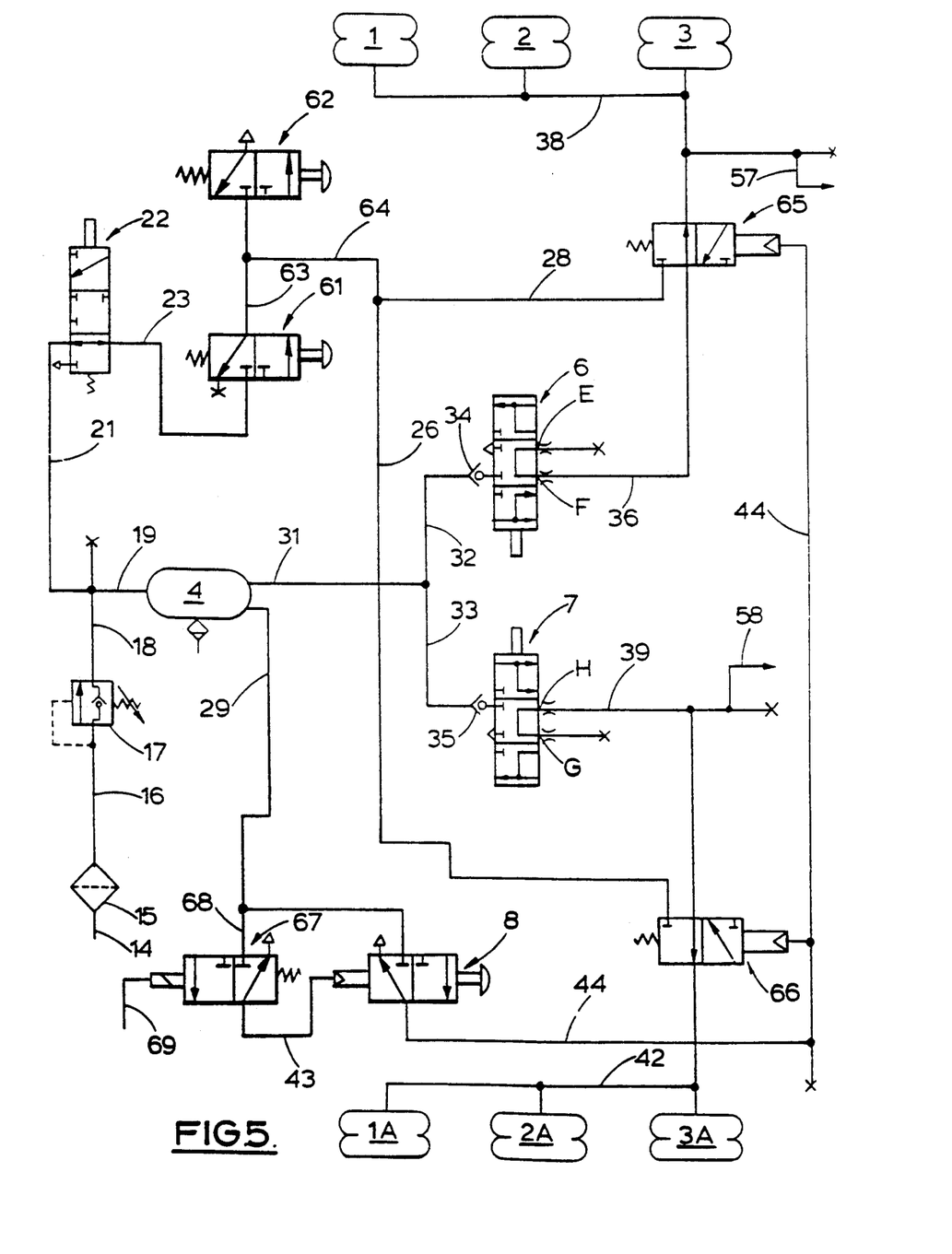
FIG. 5 is a circuit diagram similar to FIG. 1 incorporating alternative first and second valve means and a further alternative method of operating the selector valve.

Referring to FIG. 5, the arrangement is generally similar to FIG. 1 and similar reference numbers are used where applicable. In view of this only the different features of FIG. 5 will be described.

The first valve means now comprises two manually operated, spring return, two position 3-way Raise and Lower valves 61, 62 respectively. As is seen, the pressure air supply in pipe 23 is connected to Raise valve 61, and pipe 63 connects valves 61, 62 and is connected to pipe 64. Pipe 64 is connected to pipes 28 and 26 which are connected to a respective valve 65, 66 comprising the second valve meals. Height control valves 6, 7 are connected to the valves 65, 66 by respective pipes 36, 39.

The pipe 43 is connected between the pilot for the selector valve 8 and a solenoid operated, spring return, two position 3-way valve 67. A pipe 68 connects pipe 29 to valve 67. A cable 69 connects the solenoid of the valve 67 to the brake light circuit of a vehicle to which the system is fitted, whereby a brake actuation energises that valve to admit pressure air from pipe 68 to pipe 43 to cause the selector valve 8 to assume, or remain in, the condition shown in FIG. 5.

The operation of this system will now be described. It is assumed that the various valves are in the condition shown with the trailer platform at its normal height, a tractor is connected to the trailer and the combination is parked on the tractor brake and reservoir 4 is charged with pressure air. If the tractor engine is running its compressor will be supplying pressure air to the trailer air suspension system via pipe 14 and the filter 15.

In order to raise the trailer platform to be level with a dock the selector valve 8 is operated manually to admit pressure air from the reservoir 4 through the valve 8 and pipe 44 to the pilots of valves 65 and 66 whereby these valves change over. Raise valve 61 is then operated manually to the "Raise" condition. Pressure air now passes from reservoir 4 and/or the tractor compressor through height limiting valve 22 and valve 61 from whence it passes through valves 65 and 66 to the air springs 1, 2, 3 and 1A, 2A, 3A, extending them.

When the trailer platform rises to the desired height the Raise valve 61 is released sealing the pressure air in the air springs. It will have been seen that the operation of valves 65 and 66 consequent on operation of the selector valve 8, has disconnected the height control valves 6, 7 from their respective air springs, so that the normal height control mechanism has been by-passed.

In the normal course of events the operator should either select the Lower condition of the Lower valve 62 or reset the selector valve 8 manually before driving the trailer away from the dock. If he does the former, the air springs will be connected to atmosphere via Lower valve 62 and pipes 63, 64, 26, 28, and if he does the latter the valves 65 and 66 will revert. The height control valves 6, 7 will be in their "Lower" conditions (top and bottom "boxes" respectively) and the air springs will exhaust to atmosphere via the reverted valves 65, 66 and valves 6, 7 until valves 6,7 revert to the mid-selection as the trailer platform lowers to the normal ride height.

If the operator selects "Lower" with lower valve 62 but fails to reset the selector valve 8 then valves 65, 66 remain in the operated condition. The air springs will exhaust via valve 65, valve 66 and valve 62 until the latter is released.

If the operator fails to select the "Lower" condition with Lower valve 62 and also fails to reset the selector valve 8 before driving off, then his first application of the trailer service brake will cause the selector valve 8 to revert due to energisation of valve 67. This exhausts the pilots of valves 65, 66 and these revert so that the air springs are connected to the respective height control valves 6, 7 via valves 65, 66 respectively. The air springs are exhausted until the normal ride height is attained. A similar result is achieved if the selector valve 8 is reset manually before driving off. Thus the trailer platform is restored to its normal ride height from a raised position either before, or immediately as, the trailer is driven away, irrespective of whether the operator selects or fails to select the normal ride height condition, so avoiding damage to suspension and/or shock absorbers and/or air springs due to the trailer's being driven with its platform in a raised condition.

Similarly, if it is required to lower the trailer platform on docking, the system which has been described also ensures that the platform is raised back to normal ride height before, or immediately as, the trailer is driven away. Thus, selector valve 8 is operated and Lower valve 62 is moved to the "Lower" latter are connected to atmosphere via valves 65, 66 and valve 62.

When Lower valve 62 is released deflation of the air springs ceases and the valves 6, 7 will be conditioned to inflate the air springs but remain cut off from the air springs until valves 65, 66 revert. If selector valve 8 is reset manually, or through application of the trailer service brake, the valves 65, 66 revert causing the air springs to be re-inflated to normal ride height via valves 6, 65 and valves 7, 66.

Figure 6:
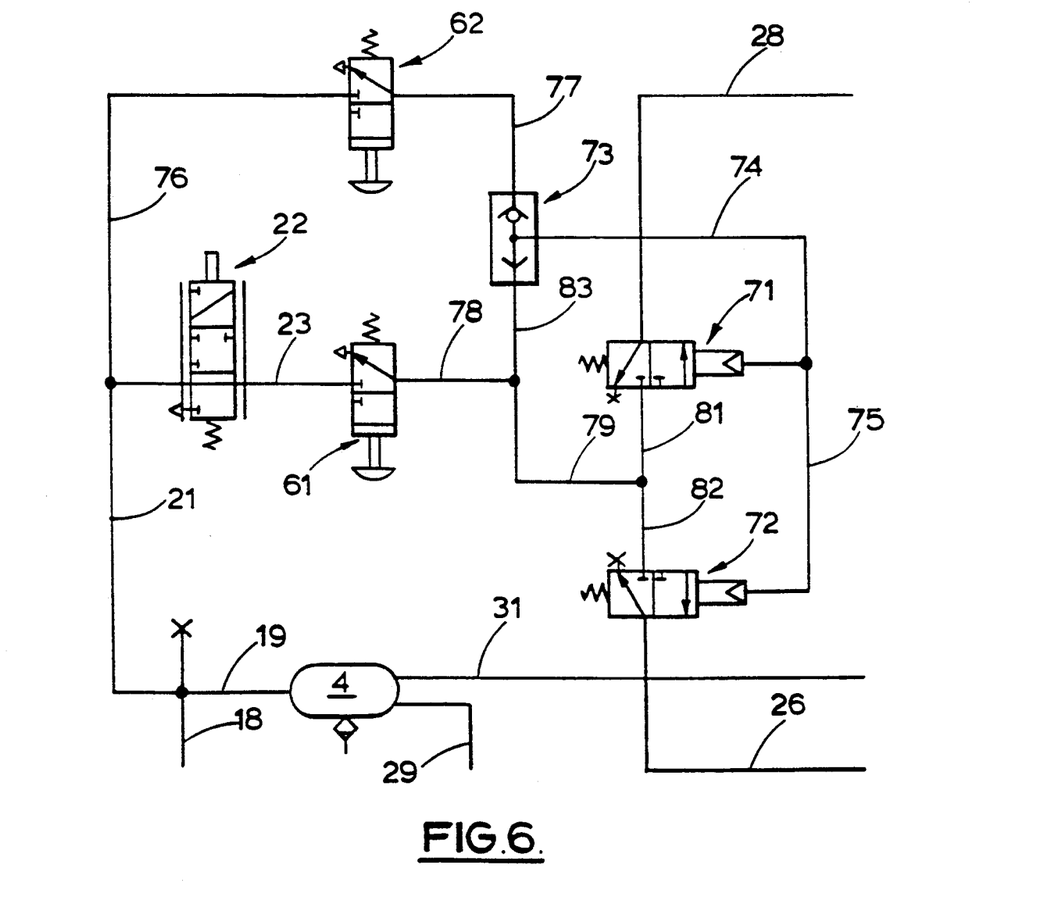
FIGS. 6, 7 and 8 are part circuit diagrams showing further alternative first valve means for use in the circuit of FIG. 5.

A modification to the circuit of FIG. 5 is shown in FIG. 6 and the same reference numerals are used to identify similar components. The modified circuit includes two additional 3-way 2-position pilot operated, spring return valves 71, 72 and a double check valve 73. The pilots of valves 71, 72 are connected to check valve 73 by pipes 74, 75. Valve 62 is connected to pipe 21 by a pipe 76 and to check valve 73 by a pipe 77. Valve 61 is connected to valves 71, 72 and 73 by pipes 78, 79, 81, 82 and 83.

Following actuation of the selector valve 8 (FIG. 1), a "Raise" selection may be made by operating Raise Valve 61 and a "Lower" selection may be made by operating Lower valve 62 (FIG. 5).

Operation of Raise valve 61 (subject to the condition of the height limiting valve 22) admits pressure air to valve 73 through pipe 83. Valve 73 operates to seal pipe 77 and passes air to the pilots of valves 71, 72 via pipes 74 and 75. Valves 71, 72 operate to allow pressure air to pass through pipes 78, 79, 81, 82 and 26, 27 to the air springs 1, 2, 3 and 1A, 2A, 3A respectively. On release of valve 61 the pipes 72, 79, 81, 82 and 83 are vented through Raise valve 61. Consequently, pipes 74, 75 are also vented and the valves 71, 72 revert, isolating the air springs 1, 2, 3 from the air springs 1A, 2A, and 3A and so maintaining roll stiffness of the vehicle in this platform raised condition.

Similarly, operation of Lower valve 62 causes operating of valves 71, 72 by admitting pressure air to their pilots via pipe 77, valve 73 and pipes 74, 75. The air springs are now connected through valves 71, 72, pipes 82, 81, 79, 78 to the Raise valve 61, through which they are vented, Release of the Lower valve 62 vents the pilots of valves 71, 72 and, as before, the air springs on each side of the vehicle are isolated by the valves 71, 72 to maintain roll stiffness of the vehicle.

Figure 7:
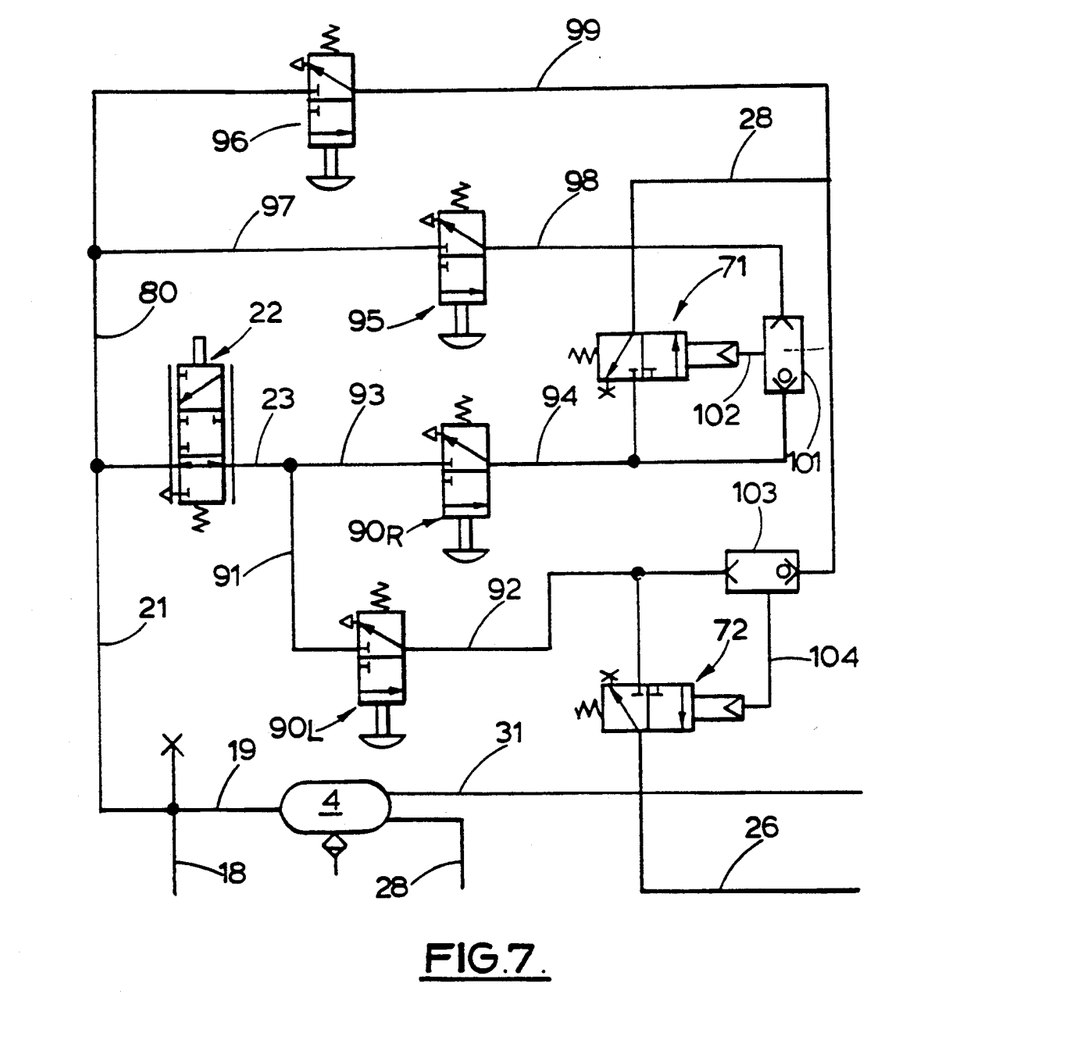

Referring now to FIG. 7, the same reference numerals are used as in FIG. 5 and, where applicable, in FIG. 6. There is now a Raise valve and a Lower valve for each side of the vehicle. The Raise valves are 90L and 90R and the Lower valves are 96 and 95.

Three-way 2-position manually operated, spring return valves 95, 96 are provided to effect operation of the pilots of valves 71, 72. Valve 95 is connected to pipe 21 via pipes 80, 97 and by pipe 98 to one end of a shuttle valve 101 whose output is connected by a pipe 102 to the pilot of valve 71. The other end of shuttle valve 101 is connected to pipe 94. Valve 96 is connected to pipe 21 via pipe 80 and by pipe 99 to one end of a shuttle valve 103 whose output is connected to the pilot of valve 72 by a pipe 104.

Raising the left hand side of the vehicle is effected by operating Raise valve 90L. This admits pressure air via the shuttle valve 103 to the pilot of valve 72 to operate it so that pressure air passes from Raise valve 90L through pipe 92 and valve 72 to the air springs 1A, 2A, 3A via valve 66 (FIG. 5). Raise valve 90L is released to vent the pilot of valve 72 and the latter reverts to retain the pressure air in the springs 1A, 2A, 3A. Lowering of the left hand side of the vehicle is effected by operation of Lower valve 96. This causes operation of valve 72 via shuttle valve 103 to connect pipe 26 to pipe 92 and the air springs 1A, 2A, 3A are vented via valves 66 and 90L, until Lower valve 96 is released.

Similarly Raise valve 90R is operated to cause raising of the right hand side of the vehicle and Lower valve 95 is operated to cause lowering of the right hand side of the vehicle.

Figure 8:
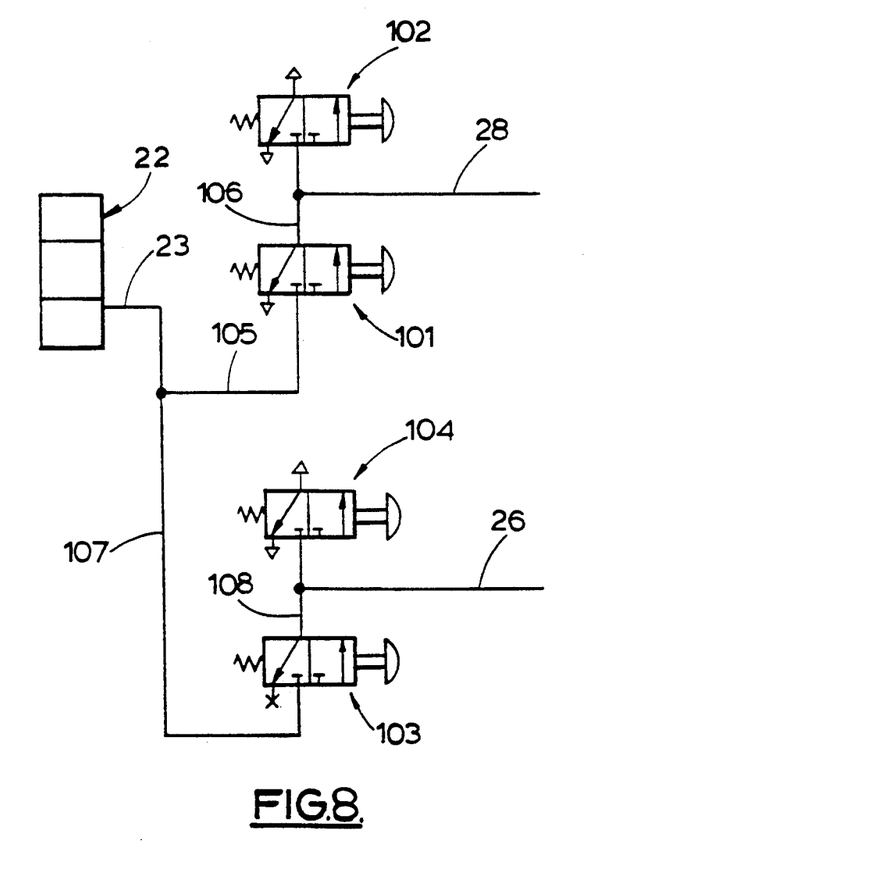

In FIG. 8 further alternative first valve means for the circuit of FIG. 5 is shown. This comprises, for each side of the vehicle, two manually operated, spring return, two position 3-way valves 101, 102 and 103, 104.

Valve 101 receives pressure air from pipe 21 (FIG. 5) via height limiting valve 22 (if fitted), pipe 23 and a pipe 105. A pipe 106 connects valves 101, 102 and pipe 106 is connected to pipe 28 (FIG. 4).

Similarly, valve 103 receives pressure air from pipe 23 via a pipe 107. A pipe 108 connects valves 103, 104 and is connected to pipe 26 (FIG. 5).

Following operation of the selector valve 8, operation of valve 101 causes extension of the air springs 1, 2, 3. Release of valve 101 and operation of valve 102 allows deflation of the air springs 1, 2, 3. Similarly, operation of valve 103 causes extension of the air springs 1A, 2A, 3A and operation of valve 104 allows deflation of these springs.

It will be seen that this construction allows elimination of the valves 71, 72 of FIG. 7.

It will be appreciated that the selector valve 8 may be operated remotely if desired, for example by cable operation or by electrical solenoid operation.

In the embodiments of the invention which have been described two height control valves 6, 7 are used. However, in many applications a single height control valve will suffice. Referring to FIGS. 1 and 2, the ports E, F of valve 6 are connected to a pressure test point (X) and pipe 36 respectively and the ports G, H of valve 7 are connected to a pressure test point (X) and to pipe 39 respectively. If a single height control valve is fitted, for example valve 6, then pipe 36 would be connected to port E and pipe 39 to port F.

In FIG. 1 pipes 57 (off pipe 38) and 58 (off pipe 39) are shown for connection to load sensing valves.

It will be appreciated that although embodiments of the invention have been described by reference to a three axle installation, the invention is equally applicable to, for example, single and twin axle installations.

In the practice of the present invention various of the valves may conveniently be assembled or grouped in a single enclosure or box to be mounted on a vehicle. The box may have a lid which is sealed to prevent ingress of dirt. A check valve may be provided to vent the interior of the box in the event of a build-up of pressure inside. The vent may be silenced. Pilot lines are preferably vented to the outside of the box so as to maintain internal integrity and prevent a build-up of moisture. Provision may be made for a heater, for example an electrical heater, for low temperature operation.

Figure 9:
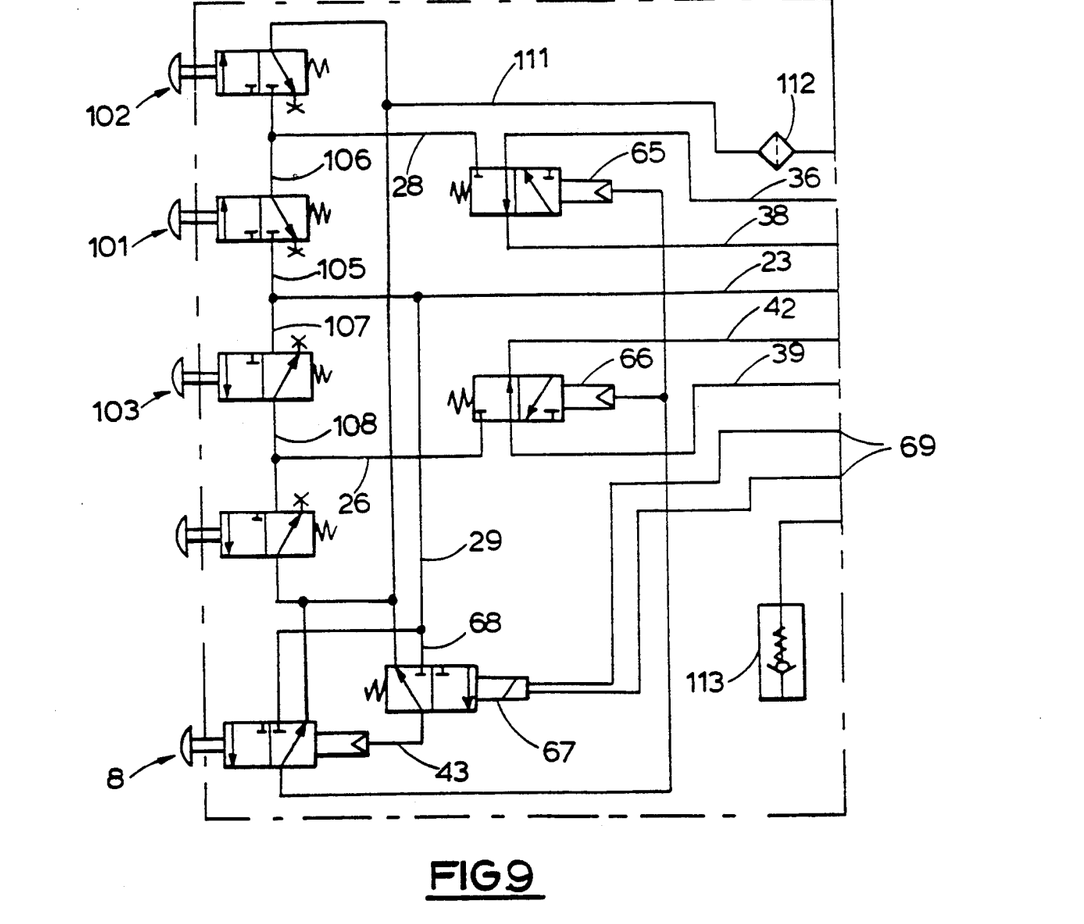
FIG. 9 is a schematic diagram showing one arrangement of valves in a control box.

Referring finally to FIG. 9, there is illustrated schematically an arrangement of components in a control box for the system of FIG. 5 as modified by FIG. 8, the components being referenced as in FIGS. 4 and 7. Exhaust from the box is via a pipe 111 and an exhaust silencer 112. A one-way vent 113 relieves pressure in the box. The components in the box may be chosen and arranged to suit the particular system required. For example, for a retro-fit it will not be necessary to include a Raise/Lower valve as 5, 5a as this will already be present on the trailer unless a complete Raise/Lower system is to be fitted to a trailer which does not have one. The invention thus also contemplates a kit of components (whether offered or fitted in a box or for individual mounting on a trailer) for conversion of an existing trailer or for fitting in a new trailer as the trailer is built.

It is customary for proprietary manufacturers of pneumatic valves to make two position three-way valves and for these to be used with one way blanked when a two-way two position valve is required. This convention has been used in the arrangements of FIGS. 5 to 9 of the drawings. It will be appreciated that if other suitable two-way two position valves are available they may be used instead.

I claim:

1. An air suspension system for a load carrying vehicle, said system comprising air springs (1, 1A; 2, 2A; 3, 3A), a height control valve means (6, 7) connected to said air springs and adapted to be pneumatically connected to a pressure air supply, a first valve means (5, 5a, 61, 62; 90L, 90R, 95, 96; 101, 102, 103, 104) whereby said height control valve means can be overridden, or by-passed, in use selectively to raise or lower a load-carrying platform of the vehicle relative to an axle of the vehicle from a normal ride height, wherein said first valve means is connected via second valve means (9, 11; 12, 13; 45, 65, 66) to said air springs, said second valve means having first and second operating conditions and being connected to said height control valve means whereby in said first operating condition said air springs are enabled to be inflated/deflated via said height control valve means and in said second operating condition said air springs are connected to said first valve means whereby said air springs may be inflated/deflated, and wherein remote operating means is provided to cause said second valve means to be operated to said second operating condition, said remote operating means comprising a selected valve (8), said selector valve having first and second operating conditions and being adapted to be connected to the pressure air supply and being in pressurized fluid communication with said second valve means for remote operation thereof when said selector valve is operated to its first operating condition and wherein means (51; 67) is provided to operate said selector valve to its second operating conditions whereby said second valve means operates in its said first operating condition and inflation/deflation of said air springs is controlled by said height control valve means.

2. An air suspension system according to claim 1 wherein said means to operate said selector valve (8) to its second operating condition comprises a pneumatically operated pilot.

3. An air suspension system according to claim 2 wherein pressure air is supplied to said pilot via an electrically operated pneumatic valve (51;67).

4. An air suspension system according to claim 3 wherein said electrically operated pneumatic valve (51; 67) is adapted for connection to a brake light circuit for a brake of a vehicle to which said system is fitted for use whereby said valve is actuated when the vehicle brake is operated.

5. An air suspension system according to claim 3 further comprising a relay switch (52) to supply electric power to said electrically operated pneumatic valve (51) for actuation of said valve, said relay switch being adapted for connection to a brake light circuit for a brake of a vehicle to which said system is fitted for use, whereby said relay switch and consequently said valve are actuated when the vehicle brake is operated.

6. An air suspension system according to claim 2 wherein said pilot is adapted to be connected to a brake line for a brake of a vehicle to which said air suspension system is fitted for use whereby said pilot is actuated when the brake is operated.

7. An air suspension system according to claim 1 wherein said second valve means comprises, for each side of a vehicle to which said system is fitted for use, a first pilot operated, spring return, two position three-way valve (9, 11; 12, 13; 65 66), said valve being connected to said first valve means (5, 5a; 61, 52; 90L, 90R, 95, 96; 101, 102, 103, 104), to said air springs (1, 1A; 2, 2A; 3, 3A) and to said height control valve means (6, 7).

8. An air suspension system according to claim 7 wherein said second valve means includes a second pilot operated, spring return, two position three-way valve (71, 72) interposed between said first three-way control valve (9, 11; 12, 13; 65, 66) and said height control valve means (6, 7) and connected also to said first valve means.

9. An air suspension system according to claim 7, wherein said first valve means comprises a manually operated five position six-way valve (5; 5a) two ways of said valve being connected to said second valve means, one way adapted to be connected to a pressure air supply, one way connected to atmosphere, one way connected to said height control valve means (6, 7), and one way connected to said air springs.

10. An air suspension system according to claim 1 wherein said second valve means comprises, for each side of a vehicle to which the system is fitted for use, a pilot operated, spring return, two position four-way valve (45, 46), two ways of said valve being connected to said first valve means (5), one way connected to said height control valve means (6, 7) and one way connected to said air springs.

11. An air suspension system according to claim 1 wherein said first valve means comprises first and second selectively operable spring return two position valves (61, 62), said first valve (61) being adapted for connection to a pressure air supply and having a connection to said second valve (62), said second valve (62) having a connection to atmosphere and the connection between said two valves being connected to valves of said second valve means (65, 66), the arrangement being such that, following operation of said selector valve (8) to its first operating condition, operation of said first valve (61) causes inflation of said air springs and operation of said second valve (62) allows deflation of said air springs.

12. An air suspension system according to claim 11 wherein said valves (61, 62) of said first valve means are manually operable.

13. An air suspension system according to claim 1 wherein said first valve means comprises, for each side of a vehicle to which the system is fitted for use, first and second selectively operable spring return two position valves (61, 62), said first valve (61) being adapted for connection to a pressure air supply and having a connection to said second valve (62), which is also connected to atmosphere, the connection between said two valves being connected to a respective valve of said second valve means (65, 66), the arrangement being such that, following operation of said selector valve (8) to its first operating condition, operation of said first valve (61) causes inflation of said air springs on the corresponding side of the vehicle and operation of said second valve (62) allows deflation of said air springs on that side of the vehicle.

14. An air suspension system according to claim 1 wherein said first valve means comprises first and second selectively operable spring return two position three-way valves (90R, 95; 90L, 96) in combination with shuttle valves (101, 103) and first and second pilot operated spring return two position valves (71, 72), each of said selectively operably valves being adapted for connection to a pressure air supply and having one way connected to atmosphere and one way to a respective shuttle valve, said shuttle valves being connected to the pilots of said pilot operated valves (71, 72), each of said pilot operated valves having one way connected to a respective valve of said second valve means (65, 66) and one way connected to that end of the shuttle valve to which said first selectively operable valve (90R, 90L) is connected, the arrangement being such that operation of said first selectively operable valve admits pressure air to said respective shuttle valve (101, 103) whereby the pilots of said pilot operated valves (71, 71) actuate their respective valves to allow flow of pressure air therethrough from said first selectively operable valve to said second valve means, and operation of said second selectively operable valve (95, 96) admits pressure air to said respective shuttle valve (101, 103) whereby said pilot operated valves (71, 72) are similarly actuated to allow flow of pressure air therethrough from said second valve means to atmosphere by way of said first selectively operable valve means (90R, 90L).

15. An air suspension system according to claim 14 wherein said selectively operable valves (90R, 95; 90L96) of the first valve means are manually operated.

16. An air suspension system according to claim 1 wherein said first valve means comprises, for each side of the vehicle to which said system is fitted for use, first and second selectively operable spring return two position three-way valves (90R, 95; 90L, 96), said valves being adapted for connection to a pressure air supply and connected to atmosphere, and a pilot operated spring return two position valve (71, 72), said first selectively operable valve (90R, 90L) being connected to said pilot of the valve (71, 72) via a shuttle valve (101, 103) connected to the same pilot operated valve (71, 72) and to the pilot of that valve via said shuttle valve (101, 103), said pilot operated valve also being connected to a respective valve of said second valve means (65, 66), the arrangement being such that for each side of the vehicle said second selectively operable valve (95, 96) admits pressure air to said pilot to actuate said pilot operated valve whereby pressure air is allowed to flow from the valve of said second valve means to atmosphere via said first selectively operable valve means (90R, 90L), and operation of said first selectively operable valve means (90R, 90L) admits pressure air to said pilot to actuate said pilot operated valve whereby pressure air is supplied to the valve of said second valve means (65, 66) and said air springs on each side of said vehicle can be deflated/inflated independently.

17. An air suspension system according to claim 1 wherein said first and second valve means and said selector valve are mounted together in a single box.

18. An air suspension system according to claim 17 further comprising a silencer (112) for pressure air being released to atmosphere from said system.

19. An air suspension system according to claim 17 further comprising a one way vent (113) to release to atmosphere any build up of pressure in said box.

20. A vehicle comprising an air suspension system as claimed in claim 1.

21. A kit of parts adapted for use in an air suspension system for a load carrying vehicle and comprising a height control valve means (6, 7) which connects to air springs and to a pressure air supply, and a first valve means (5; 5a; 61, 62; 90L, 94, 96, 101, 102, 103, 104) whereby said height control valve means can be over-ridden, or by-passed, in use selectively to raise or lower a load-carrying platform of the vehicle relative to an axle of the vehicle from a normal ride height, and further comprising second valve means (9, 11; 12, 13; 45, 46; 65, 66) having a remote operator, said second valve means being connectable to the air springs and having first and second operating conditions and being connectable to said height control valve means whereby in said first operating condition the air springs are enabled to be inflated/deflated via said height control valve means and in said second operating condition the air springs are connected to said first valve means whereby the air springs may be inflated/deflated, a two condition selector valve (8) having first and second operating conditions and being adapted to be connected to the pressure air supply and being connectable in pressurized fluid communication with said second valve means for remote operation thereof when said selector valve is operated to its first operating condition, said selector valve being operable to its second operating condition whereby said second valve means operates in its said first operating condition and inflation/deflation of the air springs is controlled by said height control valve means, said selector valve being adapted to be operable by power means to at least one of its said conditions, and conduit means (44) to connect said selector valve to said second valve means.

22. A kit of parts according to claim 21 wherein the power means by which said selector valve (8) is operable is a pneumatic pilot actuator and further comprising a low power solenoid operated two position pneumatic valve (51; 67) and means to connect said valve to said pilot actuator.

23. A kit of parts according to claim 21 further comprising a box in which all of said means and said valve are contained and connected.

* * * * *